Patented Apr. 4, 1939

2,152,655

UNITED STATES PATENT OFFICE 2,152,655

SPARK PLUG INSULATOR

Taine G. McDougal, Albra H. Fessler, and Helen Blair Barlett, Flint, Mich., assignors to General Motors Corporation, Detroit, Mich., a corporation of Delaware No Drawing. Application November 16, 1935, Serial No. 50,243

2 Claims. (Cl. 106—12)

This invention pertains to spark plug insulators made of compositions containing aluminum oxide and certain inorganic compounds which latter control the recrystallization of the composition on firing, to give a non-porous ceramic product of such a dense and compact structure as to result in an improvement in certain desirable physical characteristics, such as mechanical strength, electrical resistance at elevated temperatures, and resistance to thermal shock. When alumina recrystallizes at higher temperatures, it has a tendency to contain gas vesicles or blebs, even though it has been completely melted and allowed to crystallize from the molten state, especially in the center of the individual crystals. The lower the temperature at which this crystallization takes place, the greater the number of vesicles. Normally, corundum crystals are nearly opaque as a result of this condition. Naturally, the physical properties of completely clear crystals vary rather widely from those of the highly vesicular crystals which contain an appreciable volume of voids. We have found it possible to reduce these vesicles and to obtain homogeneous crystals by the addition of certain inorganic compounds. Further, the addition of such inorganic compounds induces formation of this denser and more compact structure at greatly reduced temperatures, which is economically highly desirable.

According to this invention the inorganic compounds added to aluminum oxide are characterized by the fact that they form eutectics with the alumina. With this class of addition agents the important advantage is obtained that the firing temperatures are reduced except in the case of the larger additions of zirconia. In the case of such additions the final product is a mechanical mixture of the original components, i. e., the added component does not enter the lattice structure of the corundum, and the physical properties are the resultant of the physical properties of the crystal phases which compose the mixture. Thus, for example, as $ThO_2$ is added to alumina in increasing quantities, the properties of the insulator become more and more like those of $ThO_2$ and less like those of alumina, always of course taking into account the effect each component has on the crystal habit of the other. In addition to $ThO_2$ other compounds falling in this class are $CeO_2$, $La_2O_3$, $ZrO_2$ and $TaO_2$. It has been found that a decidedly improved modified structure is obtained by the addition of these compounds since they tend not only to impart their own physical characteristics to the structure but to induce the recrystallization of the corundum into an extremely dense final structure. Each of the oxides has a more or less characteristic influence on the size of the corundum crystals, some inhibiting their growth, others promoting it to a marked degree.

The improved insulators are manufactured by first grinding and thoroughly mixing the ingredients. The grinding is preferably carried to a point where all of the material is in the form of a fine powder. The ingredients should be substantially free from alkali because of the deleterious effect of the latter on the electrical properties of the insulator. The insulators may be molded into shape with the air of a suitable binding agent by the process described and claimed in the application of Karl Schwartzwalder, Serial No. 3,465, filed January 25, 1935; by pressing in rubber molds as described in the application of Albra H. Fessler and Ralston Russel, Jr., Ser. No. 28,630, filed June 27, 1935, now Patent No. 2,091,973; by casting, or by any other of the known methods used in forming bodies from non-plastic materials. The first mentioned method has been found to be preferable because the resulting insulator possesses a smooth, glossy surface requiring no glaze.

The formed bodies are then fired to a suitable temperature to produce recrystallization, and this is usually accompanied by considerable shrinkage. The firing time and temperature must be controlled as in usual kiln practice so as to secure complete recrystallization and to avoid over-firing with resultant warpage of other injury to the product. Firing temperatures of from cone 30 to cone 35 (1730° C. to 1830° C.) will be found satisfactory, the exact temperature depending upon the composition of the body.

The properties of the insulator vary, of course, with the inorganic compound or mixtures thereof that are employed, and also with the quantities used. In general, the insulators are characterized by high thermal conductivity, good mechanical strength, and good electrical resistance, good resistance to heat shock, and altogether posses the properties required for successful operation as insulators of spark plugs used in automobile engines.

The bodies containing cerium oxide are especially good in respect to thermal conductivity as well as high electrical resistance. This material has the most marked effect in reducing the firing temperature of the body.

In the case of thoria where larger percentages of this material are used, for example, on the order of 20%, increased thermal conductivity is obtained as well as higher specific gravity and electrical resistance. The bodies containing thoria require a firing temperature on the order of cone 35. To secure a lower maturing temperature fluorspar or talc or other suitable flux may be added in small proportions, for example, up to 5%.

Insulators having a zirconia content of up to 20% are characterized by superior thermal conductivity. With a zirconia content greater than 20% the thermal conductivity decreases and the maturing of the bodies requires a much higher temperature. Satisfactory insulators superior to present day porcelains have been obtained with zirconia contents as high as 70%, and while these bodies have been characterized by a slight degree of porosity owing to insufficient firing temperatures, this has not seriously affected their performance in the engine. In the case of zirconia it may likewise prove desirable to add magnesia, preferably in the form of talc, fluorspar, or other suitable flux in amounts up to about 5% in order to lower the maturing temperature. If desired, several of the eutectic forming inorganic compounds may be added to the composition. A convenient way of accomplishing this is to employ as a raw material monazite sand which contains substantial proportions of cerium phosphate, thoria and other rare earths.

It may also prove desirable to combine with the alumina not only proportions of eutectic forming inorganic compounds but also proportions of inorganic compounds forming solid solutions with alumina as described and claimed in the copending application of Taine G. McDougal, Albra H. Fessler and Karl Schwartzwalder, B-7745, Serial No. 50,242, filed November 16, 1935, and/or proportions of inorganic materials forming compounds with alumina as described and claimed in the copending application of Taine G. McDougal, Albra H. Fessler and Karl Schwartzwalder, B-7829, Serial No. 50,244, filed November 16, 1935 now Patent No. 2,120,338. With these may, of course, be added small proportions of suitable fluxes such as referred to above to obtain reduction in firing temperature.

We claim:

1. A spark plug insulator made of recrystallized coroundum and cerium oxide.

2. A ceramic body especially adapted for use as an electrical insulator and the like made of recrystallized corundum and cerium oxide.

TAINE G. McDOUGAL.
ALBRA H. FESSLER.
HELEN BLAIR BARLETT.